(12) United States Patent
Igarashi

(10) Patent No.: US 8,707,992 B2
(45) Date of Patent: Apr. 29, 2014

(54) FLUID APPARATUS UNIT STRUCTURE

(75) Inventor: Hiroki Igarashi, Gyoda (JP)

(73) Assignee: Surpass Industry Co., Ltd., Gyoda-Shi (JP)

( * ) Notice: Subject to any disclaimer, the term of this patent is extended or adjusted under 35 U.S.C. 154(b) by 302 days.

(21) Appl. No.: 12/600,336

(22) PCT Filed: May 19, 2008

(86) PCT No.: PCT/JP2008/059138
§ 371 (c)(1),
(2), (4) Date: Nov. 16, 2009

(87) PCT Pub. No.: WO2008/146640
PCT Pub. Date: Dec. 4, 2008

(65) Prior Publication Data
US 2010/0163125 A1  Jul. 1, 2010

(30) Foreign Application Priority Data
May 25, 2007  (JP) ................................. 2007-139286

(51) Int. Cl.
*F16K 11/20* (2006.01)

(52) U.S. Cl.
USPC ......................................... 137/597

(58) Field of Classification Search
USPC ......... 137/884, 613, 808, 812, 813, 597, 237, 137/246.23, 269
See application file for complete search history.

(56) References Cited

U.S. PATENT DOCUMENTS

| | | | | |
|---|---|---|---|---|
| 3,311,120 A | * | 3/1967 | Palmisano | 137/1 |
| 3,461,897 A | * | 8/1969 | Clyde | 137/809 |
| 3,494,372 A | * | 2/1970 | Kiwak | 137/812 |
| 5,819,782 A | * | 10/1998 | Itafuji | 137/240 |
| 6,035,893 A | * | 3/2000 | Ohmi et al. | 137/597 |
| 6,615,871 B2 | * | 9/2003 | Morokoshi et al. | 137/884 |
| 6,832,628 B2 | * | 12/2004 | Thordarson et al. | 137/613 |
| 6,868,867 B2 | * | 3/2005 | Yamaji et al. | 137/884 |
| 2005/0072481 A1 | * | 4/2005 | Hanada et al. | 137/884 |
| 2005/0284524 A1 | * | 12/2005 | Uryu et al. | 137/596.1 |
| 2005/0284528 A1 | * | 12/2005 | Chao et al. | 137/884 |

FOREIGN PATENT DOCUMENTS

| | | |
|---|---|---|
| JP | 60164183 U | 10/1985 |
| JP | 06-117559 A | 4/1994 |
| JP | 10-011147 A | 1/1998 |

(Continued)

OTHER PUBLICATIONS

International Search Report for PCT/JP2008/059138, dated Aug. 5, 2008.

*Primary Examiner* — John K Fristoe, Jr.
*Assistant Examiner* — Kevin E Lynn
(74) *Attorney, Agent, or Firm* — Pearne & Gordon LLP

(57) ABSTRACT

A fluid apparatus unit structure is provided that can be applied to a use in which a chemical fluid is removed as necessary while chemical fluid circulation and water circulation are being carried out, a fluid such as a chemical fluid does not readily solidify therein, and the fluid apparatus unit structure is compact. In the fluid apparatus unit structure (FU) that groups together and integrates plural fluid apparatus components that are connected via a flow path into a base member (10), a linked flow path (15), which links an adjacent air pressure control valve (20A) and a manual control valve (30A) that form a first chemical fluid discharge path that carries out chemical fluid circulation, is offset from the axial center of the fluid apparatus components.

11 Claims, 6 Drawing Sheets

(56) References Cited

FOREIGN PATENT DOCUMENTS

| | | | |
|---|---|---|---|
| JP | 2000120903 A | 4/2000 |
| JP | 2001-082621 A | 3/2001 |
| JP | 2003185039 A | 7/2003 |
| JP | 2004-063833 A | 2/2004 |
| JP | 2005114090 A | 4/2005 |

* cited by examiner

FLUID APPARATUS UNIT STRUCTURE

TECHNICAL FIELD

The present invention relates to a fluid apparatus unit structure that integrates fluid apparatus components such as valves and pressure switches.

BACKGROUND ART

Conventionally, apparatuses that handle fluids (chemical fluids) such as pharmaceuticals are formed as a fluid apparatus unit structure (an integrated structure) in which the various types of fluid apparatus components (valves, regulators, various sensors such as pressure sensors, and various switches such as pressure switches), which form the constituent elements, are integrated by being connected by piping. Such fluid apparatus unit structures include those in which a chemical fluid is removed as necessary while carrying out slurried chemical fluid circulation and water circulation.

In addition, in the case in which, for example, plural fluid apparatuses for chemical fluids are used, such as in semiconductor manufacturing equipment, an integrated structure that enables fluid apparatuses for chemicals to be connected together without using piping has been proposed, and the size of the overall device can thereby be made more compact because piping becomes unnecessary (refer, for example, see Patent Document 1).

CITATION LIST

Patent Literature

Patent Document 1:
Japanese Unexamined Patent Application, First Publication No. 2000-120903 (refer to FIG. 1).

DISCLOSURE OF INVENTION

However, in a fluid apparatus unit structure in which the chemical fluid can be removed as necessary while carrying out the chemical fluid (slurry) circulation and water circulation, there is a problem in that a slurried chemical fluid will readily solidify when it pools. Thus, in a fluid apparatus unit structure that handles slurried chemical fluids and the like, it is desired to have a compact integrated structure in which flow paths where a chemical fluid may pool and solidify are made as small as possible.

A fluid apparatus unit structure that is shown in FIG. 7 is configured such that three valves 1A, 1B, and 1C, are linked in series by a flow path 2, which is on a line that is coaxial with the three valves 1A, 1B, and 1C. In such an inline-type structure, the cross-sectional area of the flow path generally expands in a space portion 3 that is formed inside each of the valves and that is used to accommodate the valve bodies.

Thus, due to the positional relationship between the flow path 2 and the spaces 3, stagnation areas S such as those, for example, shown by the hatched portions shown in FIG. 7, are formed that cause the flow of the fluid to pool. In the illustrated example, the main stream of the fluid that is flowing from valve 1A into valve 1B flows toward the valve 1C by passing from a lower fluid outlet 4 through the flow path 2. However, a portion of space having a concave shape is formed at the peripheral side portions of the space portion 3, which is distant from the center of the main stream, and thus, a portion of the fluid pools in this concave portion to form a stagnation area S.

In the case in which a fluid is flowing that readily solidifies, such as, in particular, a slurried chemical fluid, the formation of these stagnation areas S is not preferable because a condensate of the chemical fluid will attach to the inside of the valve.

In consideration of the circumstances described above, it is an object of the present invention to provide a compact fluid apparatus unit structure that is suitable for removing a chemical fluid as necessary while, for example, carrying out chemical fluid circulation and water circulation, and the condensation of the chemical fluid does not readily occur.

The present invention uses the following solution to solve the problems described above.

In a first aspect of the fluid apparatus unit structure according to the present invention, in a fluid apparatus unit structure in which plural fluid apparatus components that are connected via a flow path are grouped together and integrated into a base member, a linked flow path, between adjacent flow device components, that forms a flow path that carries out chemical fluid circulation is offset from the axial center of the flow device.

According to such a fluid apparatus unit structure, because a linked flow path, between the adjacent fluid apparatus components, forming the flow path that carries out chemical fluid circulation, is offset from the axial center of the fluid apparatus components, a flow that swirls inside the space is imparted to the fluid that flows through the fluid apparatus components.

The fluid apparatus components in this case are preferably valves that are provided with plug-type valve bodies, and thereby, the edge portion of an opening that is formed at the bottom, at which a concave portion is not present, can serve as the valve seat.

In a second aspect of the fluid apparatus unit structure according to the present invention, in a fluid apparatus unit structure in which plural fluid apparatus components that are connected via the flow path are grouped together and integrated into a base member, a linked flow path, between adjacent fluid apparatus components, forming the flow path that carries out chemical fluid circulation slants downward from the upstream side toward the downstream side in the direction of the flow.

According to such a fluid apparatus unit structure, because a linked flow path, between the adjacent flow apparatus components, forming the flow path that carries out chemical fluid circulation slants downward from the upstream side toward the downstream side in the direction of the flow, a chemical fluid that readily pools and solidifies can flow downward under its own weight through the linked flow path that is inclined downward.

In a third aspect of the fluid apparatus unit structure according to the present invention, in a fluid apparatus unit structure in which a fluid circuit that removes a chemical fluid as necessary while carrying out chemical fluid circulation and water circulation is integrated by grouping together plural fluid apparatus components that are connected via the flow path into a base member, a flow path for chemical fluid circulation is formed via the valve body accommodating space of the valves that have been disposed on the flow path for water circulation.

According to such a fluid apparatus unit structure, because the flow path for chemical fluid circulation is formed via the valve body accommodating spaces of the valves that have been disposed in the flow path for water circulation, the length of the flow path can be reduced.

In this case, preferably, valves are provided with a plug-type valve body in the valve body accommodation space, and the water circulation circuit communicates with the bottom of the valve body. The displacing and flushing out of the chemical fluid by water is thereby facilitated.

According to the fluid apparatus unit structure of the present invention described above, the formation of a stagnation area S in a flow path of a fluid apparatus unit structure is prevented by forming a flow that swirls in the space, and in particular, it is possible to prevent or suppress a condensate of the chemical fluid from attaching inside a valve due to the pooling and solidifying of a fluid that readily solidifies, such as a chemical fluid in the form of a slurry. Therefore, it is possible to provide a compact fluid apparatus unit structure that can be applied when a chemical fluid is removed as necessary while carrying out chemical fluid circulation and water circulation, and furthermore, the fluid such as a chemical fluid does not readily solidify.

BEST MODE FOR CARRYING OUT THE INVENTION

Figure 1:
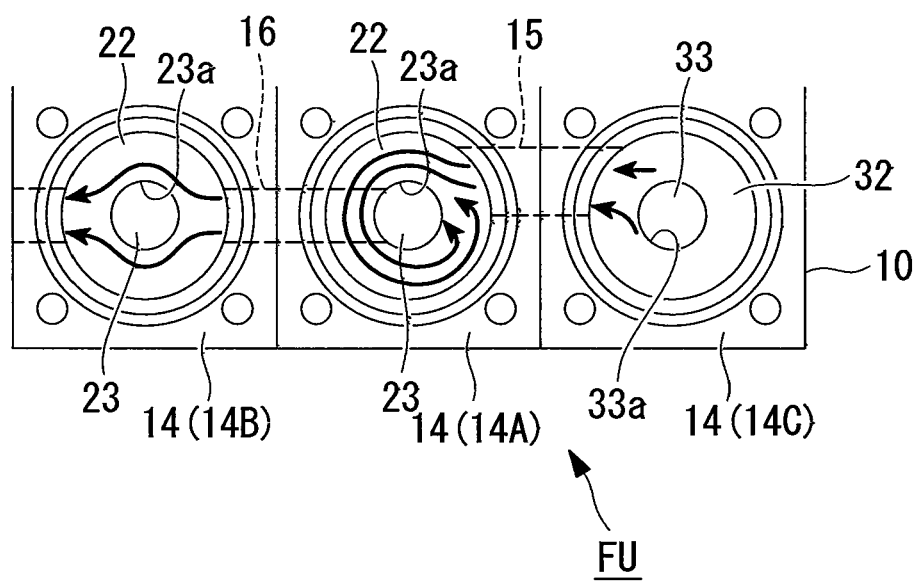
FIG. 1 is a plan view of the essential components of an embodiment of a flow apparatus unit structure according to the present invention that shows a flow path that is formed in a base member.
Figure 2:
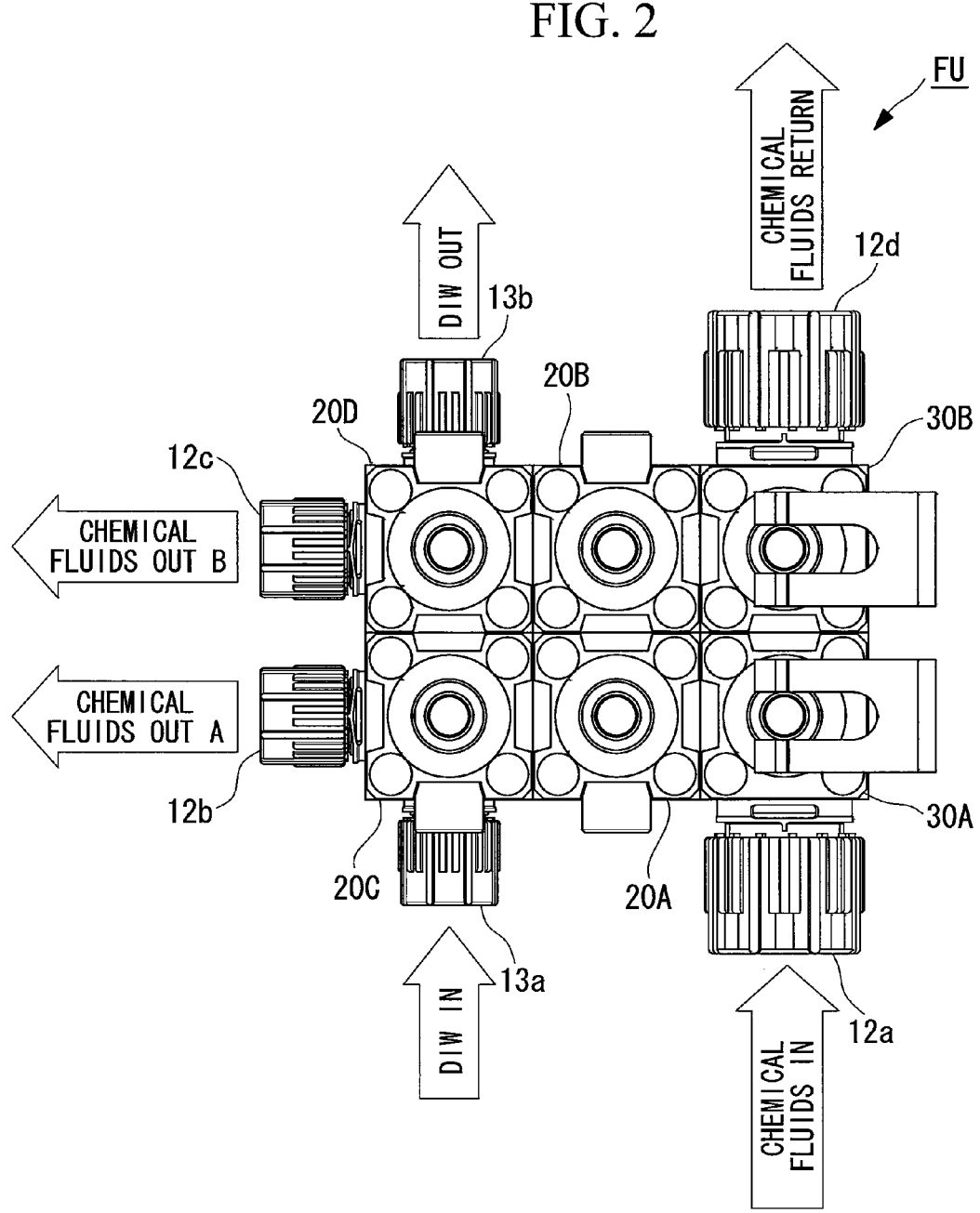
FIG. 2 is a plan view of an embodiment of a fluid flow apparatus unit structure according to the present invention that shows an external view.

Below, an embodiment of the fluid apparatus unit structure according to the present invention will be explained with reference to the figures.

The structure of the fluid apparatus unit FU that is shown in FIG. 2 to FIG. 5 is one in which plural fluid apparatus components that are connected via the flow path are grouped together and integrated into a base member 10. In the illustrated example of the structure, the main portions of the fluid apparatus unit 1 are made of a chemical-resistant fluorocarbon resin, four air pressure control valves 20A, 20B, 20C, and 20D and two manual control valves 30A and 30B serve as fluid apparatus components, and these fluid apparatus components are grouped together and integrated into a base member 10. The reference numeral 11 in the figures indicates a base fastening plate.

Figure 3:
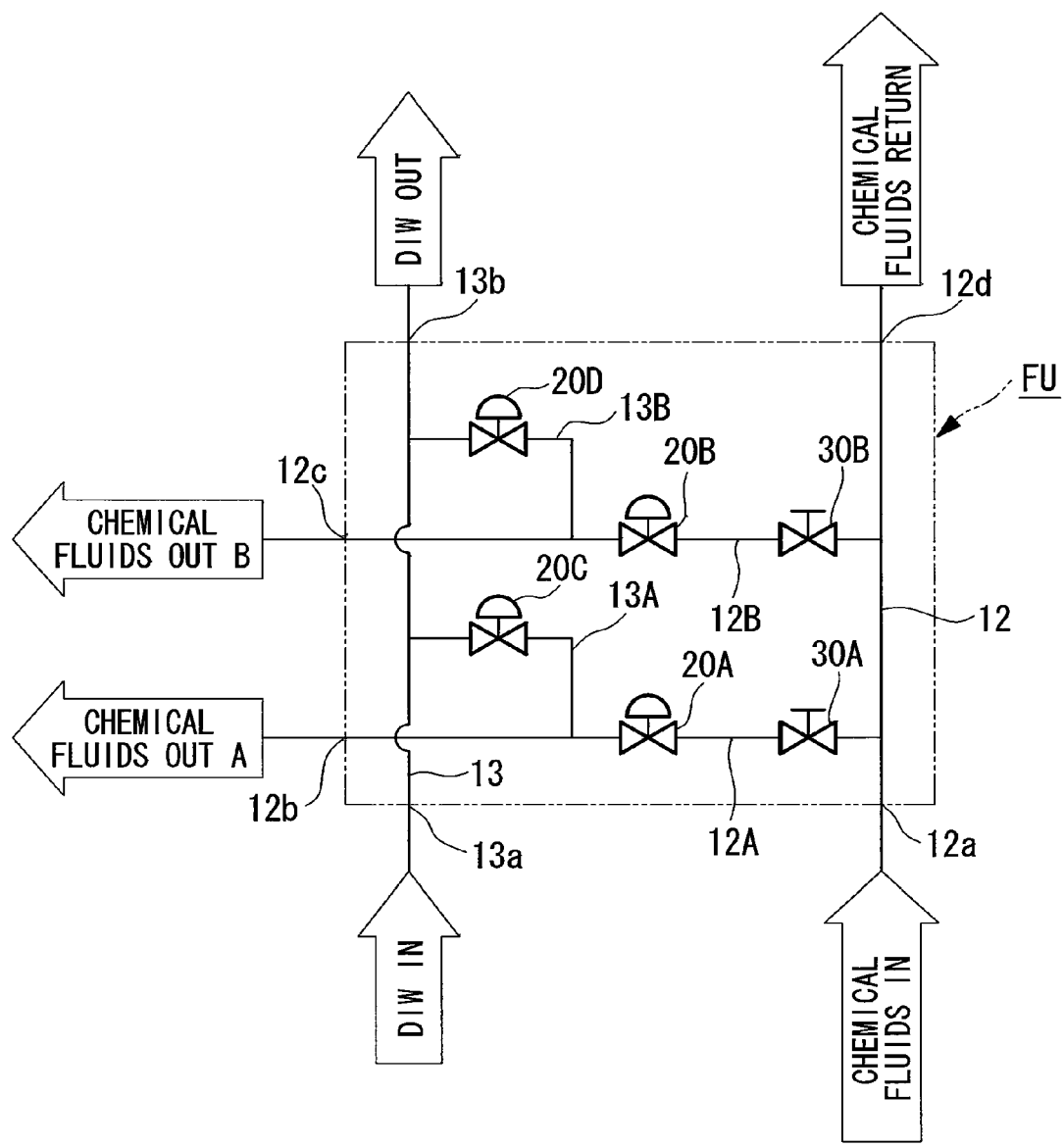
FIG. 3 is a schematic diagram that shows an example of a flow path configuration that is formed in the flow apparatus unit in FIG. 2.

FIG. 3 shows the flow path (circuit) structure of a fluid apparatus unit FU, and in this example of a flow path structure, a first air pressure control valve 20A and a first manual control valve 30A are provided in a first chemical fluid discharge path 12A that branches from the chemical fluid flow path 12, and similarly, a second air pressure control valve 20B and a second manual control valve 30B are provided on a second chemical fluid discharge flow path 12B that branches from the chemical fluid flow path 12. The air pressure control valves 20A and 20B used here are, for example, normally closed type on-off valves.

A third air pressure control valve 20C is provided on a first pure water flow path 13A that branches from the ultrapure water (DIW) flow path 13 and is linked further downstream than the air pressure control valve 20A to the first chemical fluid discharge path 12A. Similarly, a fourth air pressure control valve 20D is provided on a second pure water flow path 13B that branches from the deionized water (DIW) flow path 13 and is linked further downstream than the air pressure control valve 20B to the second chemical fluid discharge path 12B. The air pressure control valves 20A and 20B that are used here are provided, for example, with an aperture regulating mechanism on a normally closed type valve.

In the figures, reference numeral 12a indicates a chemical fluid inlet, 12b indicates a first chemical fluid outlet, 12c indicates a second chemical fluid outlet, 12d indicates a chemical fluid return outlet, 13a indicates a pure water inlet, and 13b is a pure water outlet.

Figure 4:
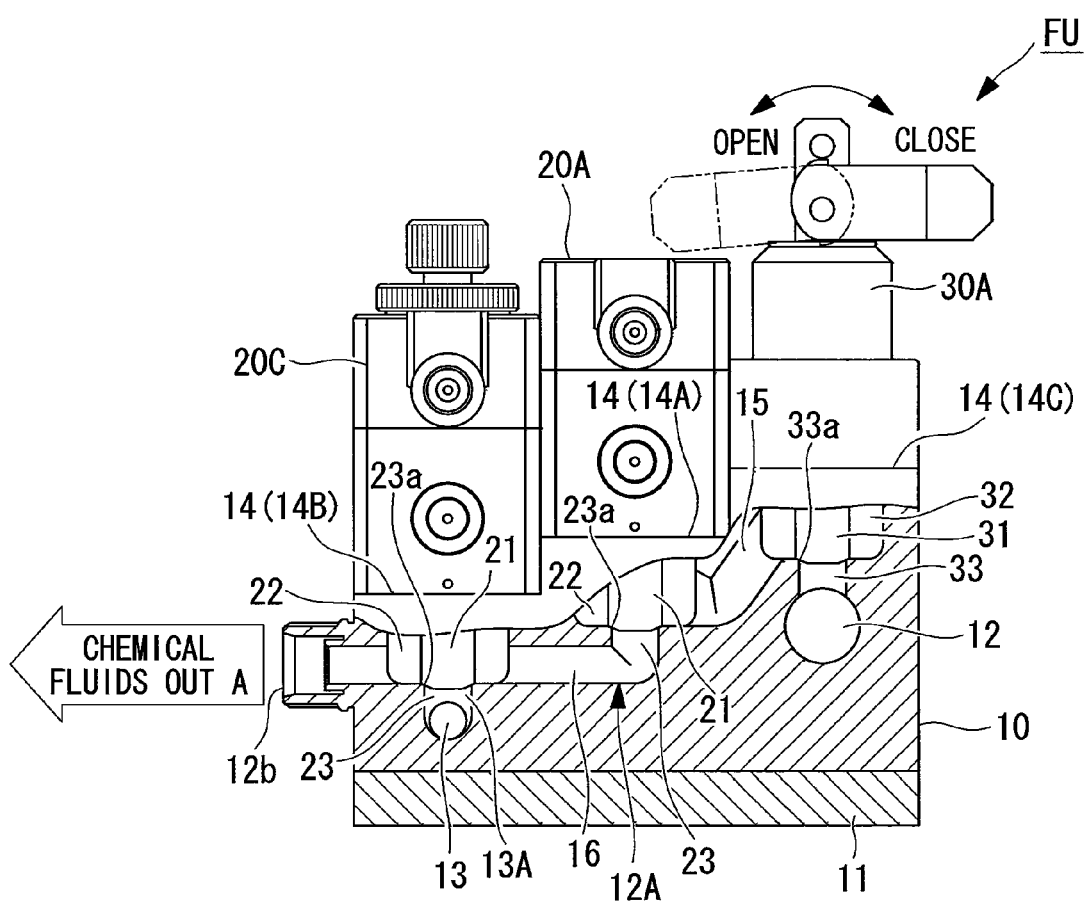
FIG. 4 is a cross-sectional view of the essential components in which the fluid apparatus unit that is shown in FIG. 2 is viewed from the front.
Figure 5:
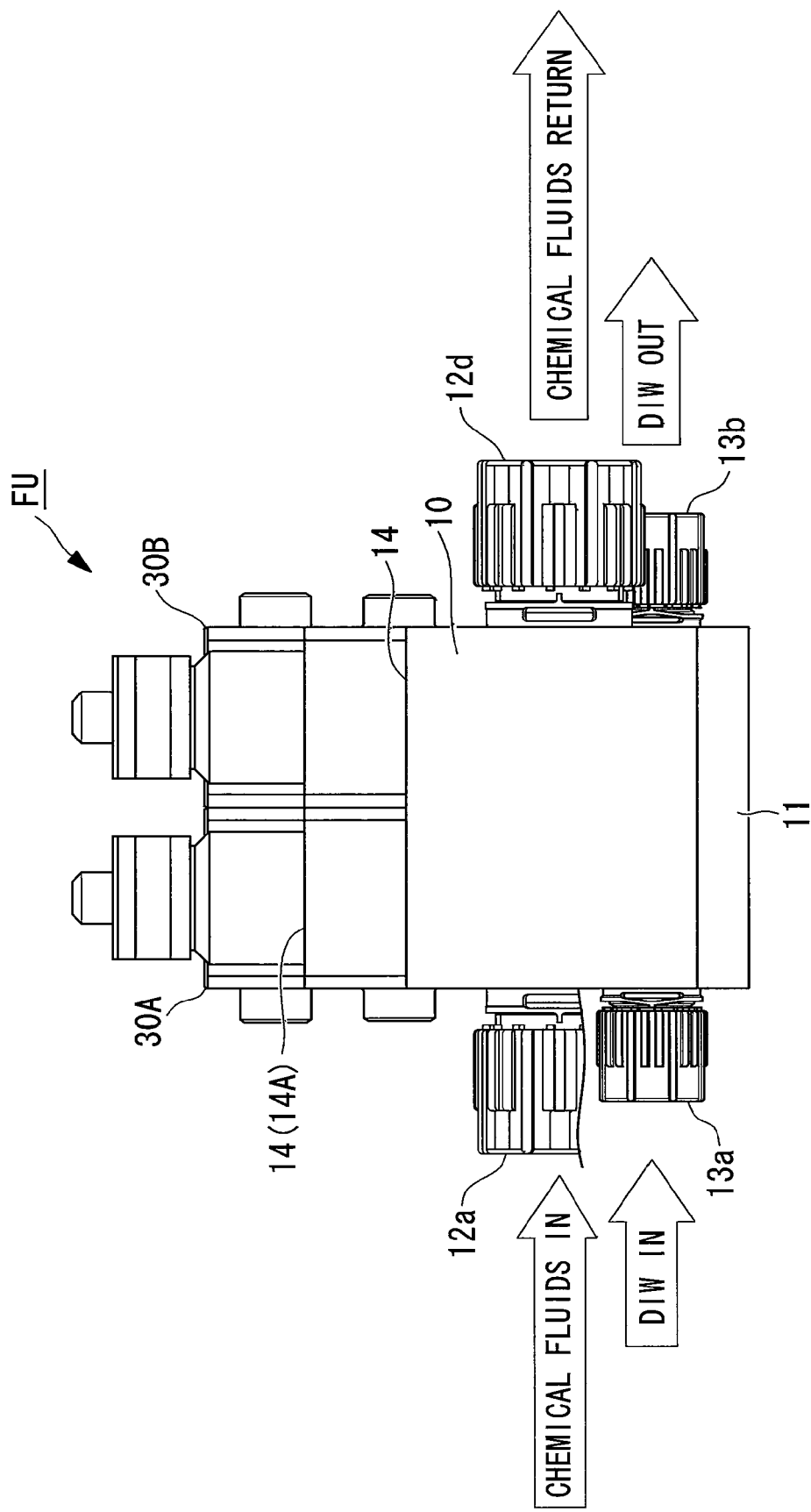
FIG. 5 is a view of the right side of FIG. 2.

As shown, for example, in FIG. 4, the base member 10 is provided with plural installation surfaces 14, each having a different height, that are provided for installing the fluid apparatus components described above. These plural installation surfaces 14 are linked together by each of the above-described flow paths that are formed inside the base member 10.

In the illustrated structure, the base member 10 has a substantially rectangular solid shape. In order to install the fluid apparatus components described above on the upper surface thereof, six installation surfaces, which are disposed such that the center positions thereof define a rectangle, are provided.

In the following explanation, because the first chemical fluid discharge path 12A and the second chemical fluid discharge path 12B have substantially identical structures, the first chemical fluid discharge path 12A side will be explained. The installation surface on which the first air pressure control valve 20A is installed serves as a first installation surface 14A, the installation surface on which the third air pressure control valve 20C is installed serves as a second installation surface 14B, and the installation surface on which the first manual control valve 30A is installed serves as a third installation surface 14C.

In the flow path structure that is shown in FIG. 3, during normal operation, the two manual valves 30A and 30B are both open, and furthermore, the two air pressure control valves 20A and 20B are set so as to be completely open. A flow rate adjustment function is provided in the remaining two air pressure control valves 20C and 20D, and when completely open or completely closed, the respective valve apertures can be adjusted. In this state, a slurried chemical fluid is introduced into the fluid apparatus unit FU from the chemical fluid inlet 12a of the chemical fluid flow path 12, and as necessary, the air pressure control valve 20A is opened to supply the chemical fluid to the first chemical fluid outlet 12b.

When ultrapure water is supplied from the first chemical fluid outlet 12b, the air pressure control valve 20A is closed and the air pressure control valve 20C is opened. At this time, the flow rate adjustment function of the air pressure control valve 20C is used for supplying ultrapure water, and the supply rate of the ultrapure water can be adjusted. For any portion of the chemical fluid that is introduced into the chemical fluid inlet 12a, a remainder that has not been distributed to the first chemical fluid discharge flow path 12A and the second chemical fluid discharge path 12A is discharged to the outside of the fluid apparatus unit FU from the chemical liquid return opening 12d.

When the air pressure control valves 20A and 20B are closed, the chemical fluid that has been introduced from the chemical fluid inlet 12a flows to the outside of the fluid apparatus unit FU from the chemical fluid return outlet 12d and is then circulated. Because the chemical fluid always flows without pooling irrespective of the open or closed state of the air pressure control valves 20A and 20B and the like, it is possible to thereby prevent a slurried chemical fluid from pooling and solidifying.

In the ultrapure water flow path 13 side as well, a process that is similar to that of the chemical flow path 12 described above is carried out. Specifically, the ultrapure water that has been introduced from the pure water inlet 13a is discharged from the ultrapure water outlet 13b, and irrespective of the open or closed state of the air pressure control valves 20C and 20D, the ultrapure water can always circulate by flowing without inducing a countercurrent. Problems such as the growth of bacteria that can occur in ultrapure water when the flow stops can be eliminated.

As described above, in the fluid apparatus unit structure FU, in which plural flow apparatus components that are connected by a flow path are grouped together and integrated into a base member, a linked flow path, between the adjacent flow apparatus components, forming the flow path that carries out chemical fluid circulation is offset from the axial center of the fluid apparatus components.

This structure will be explained in detail with reference to FIG. 1 and FIG. 4. FIG. 1 is a plan view of the base member 10, and shows a state of the half of the above-described first fluid apparatus unit structure FU on chemical fluid discharge flow path 12a side, in which the valve body has been removed. Specifically, in order, from the right side of the page, the installation surface 14C for the manual control valve 30A, the installation surface 14A for the air pressure control valve 20A, and the installation surface 14B for the air pressure control valve 20C are arranged coaxially on one row.

Among these, the space between the adjacent manual control valve 30A and the air pressure control valve 20A, which form a flow path through which the chemical fluid flows, is connected by a linked flow path 15 that is offset from the axis that joins the axially center position of both valves.

Specifically, at the side of the one manual control valve 30A, a concave accommodation space portion 32, in which the valve body 31 is accommodated and installed, is formed in a substantially tubular shape in the installation surface 14C, and on the lower face (bottom portion) of the accommodation space portion 32, an inlet opening 33, for chemical fluid, that communicates with the lower chemical fluid flow path 12 opens at the center position of the valve. On the air pressure control valve 20A side, a concave accommodating space 22, in which the valve body 21 is accommodated and installed, is formed in a substantially tubular shape in the installation surface 14A. At the lower surface (bottom portion) of the accommodation space 22, an outlet opening 23 for the chemical fluid opens at the center position of the valve. The center positions of the manual control valve 30A and the air pressure control valve 20A are disposed coaxially.

In this case, the air pressure control valve 20A and the manual control valve 30A are configured to use the plug-type valve bodies 21 and 31. Thus, in the accommodation spaces 22 and 32 for the air pressure control valve 20A and the manual control valve 30A, the edge portion of the opening portion can be used as a valve seat, in which the opening portion is formed at the bottom portion without any concave portion that could serve as a pooling area for a chemical fluid. Specifically, the distal end portion of the plug-type valve bodies 21 and 31 are sealed so as not to enter into the outlet openings 23 and 33, and thus the edge portions 23a and 33a of the outlet openings 23 and 33 can be used as a valve seat. Therefore, due to having a structure in which the accommodation spaces 22 and 32 for the air pressure control valve 20A and the manual control valve 30A have no concave portions in the bottom portion, the pooling of a chemical fluid can be prevented.

The linked flow path 15 that links the space between the concave portion 32 of the manual control valve 30A and the concave portion 22 of the air pressure control valve 20A is provided at a position translated from the axially center line that joins the center position of both valves. In the illustrated example, the translation is from the axially center line that joins the center positions of both valves toward the second chemical fluid discharge flow path 12B side of the flow apparatus unit structure FU.

The linked flow path 15 in this case is provided so as to slant downward from the upstream side toward the downstream side in the direction of the flow. Specifically, the concave portion 32 on the manual control valve 30A side is at a position that is higher than that of the concave portion 22 on the air pressure control valve 20A side, and in the direction of the flow of the chemical fluid, the chemical fluid flows through the linked flow path 15 that slants downward from the manual control valve 30A side on the upstream side near the chemical fluid flow path 12 toward the air pressure control valve 20A side on the downstream side.

By using such a structure, when a chemical fluid is introduced from the manual control valve 30A to the air pressure control valve 20A, this chemical fluid is introduced at a position that is offset from the axial center of the accommodation space 22, which has a substantially circular cross-section. Thus, because a swirling flow of the chemical fluid is generated in the accommodation space 22, the pooling of a chemical fluid does not readily occur even at the outer peripheral sides of the accommodation space 22, which is positioned so as to be separated from the outlet opening 21. Specifically, the chemical fluid that flows into the accommodation space 22 does not pool and stagnate because a swirling flow is formed, and the chemical fluid is discharged from the outlet opening 23 while flowing by swirling through the accommodation space 22. Thus, inside the accommodation space 22 of the air pressure control valve 20A, because a slurried chemical fluid does not pool, it is possible to prevent the chemical fluid from stagnating and solidifying.

Figure 6:
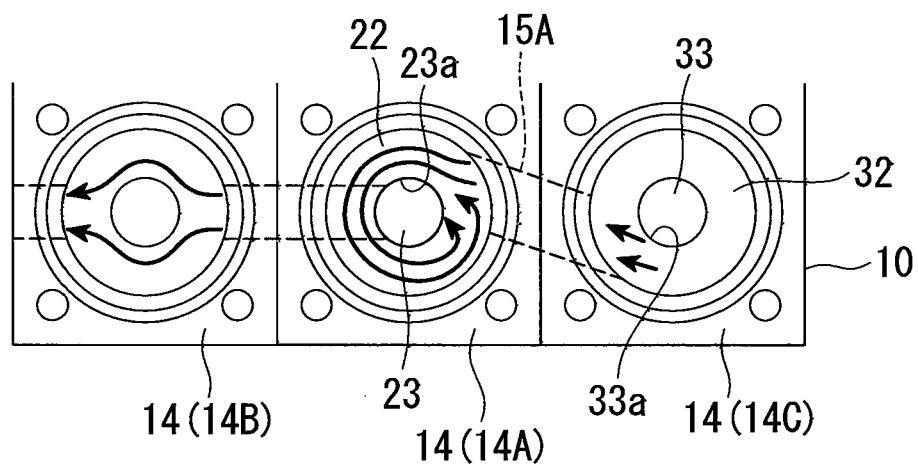
FIG. 6 is a modified example of the base member that is shown in FIG. 1.
Figure 7:
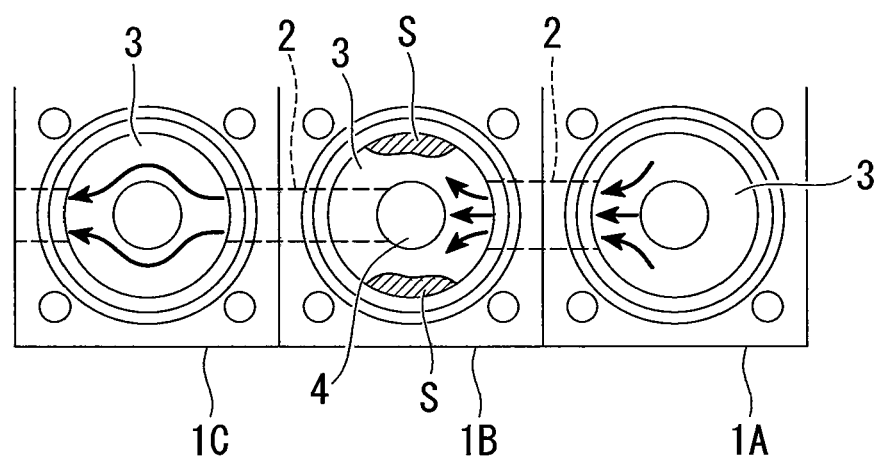
FIG. 7 is a plan view of the essential components that shows a conventional example of a flow path that is formed in a base member.

Such an offset structure of the flow path that forms a swirling flow is not limited to the linked flow path 15 that is shown in FIG. 1, but, for example, a modification such as that shown in FIG. 6 is also possible. In FIG. 6, the portions that are identical to those of the embodiment that has been described above are indicated by the same reference numerals.

In this modification, a linked flow path 15A is provided that intersects the axial center line that joins the center positions of both valves. In the accommodation space 22 of the air pressure control valve 20A, the linked flow path 15A can also form a swirling flow that is similar to that of the linked flow path 15 described above.

Because the linked flow path 15 slants downward, the chemical fluid will flow downwards under its own weight even of the flow thereof has stopped. Thus, the chemical fluid does not pool and solidify in the linked flow path 15.

On the manual control valve 30A side, because the chemical fluid flows from the bottom of the accommodation space portion 32, and at the same time, because the accommodation space portion 32 has a shape in which there is no concave portion in the bottom due to using a plug-shaped valve body 31, any chemical fluid that remains inside the accommodation space portion 32 will either flow down toward the chemical fluid flow path 12 through the inlet opening 33 or flow downward toward the air pressure control valve 20A side through the linked flow path 15. As a result, it is possible to prevent both a chemical fluid from being retained in the manual control valve 30A and this chemical fluid from solidifying.

As described above, in a flow apparatus unit structure in which a fluid circuit, wherein a chemical fluid is removed as necessary while carrying out chemical fluid circulation and water circulation, is integrated by grouping together into a base member plural flow apparatus components (valves and the like) that are connected via the flow path, a flow path for chemical fluid circulation is formed so as to pass through valve body accommodation spaces for valves that are disposed on the flow path for water circulation.

Specifically, as explained in detail with reference to FIG. 1 and FIG. 4, the first chemical fluid discharge flow paths 12A and 12B, which are flow paths for chemical fluid circulation, are formed so as to pass through the accommodation space 22 that accommodates the valve bodies 21 of the air pressure control valves 20C and 20D disposed in the first pure water flow paths 13A and 13B, which are the flow paths for water circulation.

Therefore, after a chemical fluid flows into the accommodation space 22 of the air pressure control valve 20A from the manual control valve 30A, the first chemical fluid discharge flow path 12A that is shown in FIG. 1 and FIG. 4 guides a chemical fluid through the linked flow path 16 into the accommodation space 22 of the air pressure control valve 20C. In addition, irrespective of the open or closed state of the air pressure control valve 20C, the accommodation space 22 of this control valve 20C serves as a flow path for the chemical fluid, and forms a portion of the first chemical fluid discharge path 12A that communicates with the first chemical fluid outlet 12b.

When such a fluid apparatus unit structure FU is used, the first chemical fluid discharge flow path 12A for chemical fluid circulation is formed so as to pass through the accommodation space 22, which accommodates the valve body 21 of the air pressure regulating valve 20C that is disposed in the first pure water flow path 13A for water (ultrapure water) circulation. Thus, it is possible to reduce the length of the flow path that is formed in the base member 10. In the flow path configuration that has been described above, the air pressure control valve 20A is provided with an outlet opening on the bottom surface side of the accommodation space 22. Thus, the installation surface 14B of the air pressure control valve 20C is lower than the installation surface 14A for the air pressure control valve 20A, whereby a portion in which a chemical fluid can pool is not formed at the bottom portion between the valves 20A and 20C.

In particular, in the flow path configuration described above, the air pressure control valve 20C is provided with a plug-type valve body 21 in the accommodation space 22, and the ultrapure water flow path 13, which is a water circulation circuit, communicates with the bottom of the valve body 21 via the first pure water flow path 13A. Therefore, if ultrapure water is supplied by completely closing the manual control valve 20A and completely opening the air pressure control valves 20A and 20C, the chemical fluid that pools in the linked flow paths 15 and 16 and the accommodating space 22, which are downstream of the manual control valve 30A, can be easily displaced and flushed out by the pure water.

As described above, according to the fluid apparatus unit FU of the present invention, by forming a flow that swirls within the space of the accommodating spaces 22, it is possible to prevent stagnation spaces S from forming within the chemical fluid circulation flow path that is formed in the base member 10. In particular, in the fluid apparatus unit FU that handles fluids that easily solidify, such as a slurried chemical fluid, it is possible to prevent and suppress condensate from attaching therein due to the pooling and solidification of the chemical fluid. Thus, the fluid apparatus unit FU can be applied to a use in which a chemical fluid is removed as necessary while chemical fluid circulation and water circulation are being carried out. Furthermore, it is possible to provide a compact fluid apparatus unit structure in which a fluid such as a chemical fluid does not readily solidify.

In the embodiment that has been described above, a base member 10 provided with six installation surfaces 14 is used, but the number and disposition and the like of the installation surfaces 14 is not limited in particular, and these can be appropriately modified depending on the number of fluid apparatuses that are formed into a unit. The fluid apparatus components such as the manual control valves and the air pressure control valves that are disposed in the chemical fluid flow path 12 are not limited by the embodiment described above, and depending on the object and use, suitable modifications within a range that does not depart from the spirit of the invention are possible with respect to the disposition sequence and number, and the manual and air pressure control methods and the like.

REFERENCE SIGNS LIST

Brief Explanation of the Symbols

FU fluid apparatus unit
10 base member
11 base fastening plate
12 chemical fluid flow path
12A first chemical fluid discharge flow path
12B second chemical fluid discharge flow path
13 ultrapure water flow path
13A first pure water flow path
13B second pure water flow path
14 installation surface
15A, 15B, 16 linked flow path
20A, 20B, 20C, 20D (first to fourth) air pressure control valves
21, 31 valve body
22, 32 accommodation space
23 outlet opening
23a, 23b edge portion
30A, 30B manual control valve
31 valve body
32 accommodation space
33 inlet opening

The invention claimed is:
1. A fluid apparatus unit structure comprising:
a plurality of fluid apparatus components that are connected via a flow path and grouped together and integrated into a base member, with said fluid apparatus components being positioned adjacent to each other to form a chemical fluid path that carries out circulation of chemical fluid, said fluid apparatus components having installation surfaces with heights that are different from each other and that are linked to each other by the fluid path,
a chemical fluid inlet and a chemical fluid outlet, with the fluid apparatus components being positioned therebetween such that the chemical fluid flows from the chemical fluid inlet toward the chemical fluid outlet, wherein the installation surfaces and their associated flow paths which are adjacent to each other and the adjacent installation surfaces have heights which are reduced stepwise from the upstream side toward the downstream side in the flow direction, the flow path slants downward from the upstream side toward the downstream side in the flow direction so that the chemical fluid drops naturally and flows downwards under its own weight by gravity, each of the fluid apparatus components has a chemical fluid discharge port that is higher than a downstream discharge port of an adjacent fluid apparatus component, and the height of the chemical fluid outlet is lower than that of the chemical fluid inlet.

2. A fluid apparatus unit structure comprising:

a fluid circuit having a plurality of fluid apparatus components that are linked together by a flow path and that are connected via the flow path to a base member, said fluid apparatus components having installation surfaces with heights that are different from each other such that the heights of adjacent installation surfaces are reduced stepwise from an upstream side toward a downstream side in a direction of flow so that a chemical fluid can flow, each of said fluid apparatus components having a chemical fluid discharge port that is lower than a chemical fluid discharge port of an adjacent upstream fluid apparatus component, wherein said fluid circuit removes a chemical fluid as necessary while chemical fluid circulation and water circulation are being carried out, a chemical fluid inlet and a chemical fluid outlet, with a height of the chemical fluid outlet being lower than a height of the chemical fluid inlet such that a chemical fluid flows from the chemical fluid inlet toward the chemical fluid outlet, said flow path for chemical fluid circulation passes through valve body accommodating spaces for valves that are disposed on a flow path for water circulation, and the flow path for chemical fluid circulation slants downward from the upstream side toward the downstream side in the flow direction so that the chemical fluid drops naturally and flows downwards under its own weight by gravity, wherein upon entry of a chemical to a first fluid apparatus component, the flow path is streamlined such that it continually traverses in a direction that is non-upward.

3. The fluid apparatus unit structure according to claim 2, wherein the valves are provided with a plug-type valve body in the valve body accommodating spaces, and the water circulation flow path communicates with a bottom of the valve body.

4. The fluid apparatus unit structure according to claim 1, wherein the fluid apparatus components are valves provided with plug-type valve bodies.

5. The fluid apparatus unit structure according to claim 1, wherein a linked flow path, between adjacent fluid flow apparatus components, is offset from an axial center of the fluid apparatus components.

6. The fluid apparatus unit structure according to claim 2, wherein a linked flow path, between adjacent fluid flow apparatus components, is offset from an axial center of the fluid apparatus components.

7. A fluid apparatus unit structure comprising:

a plurality of valve bodies positioned substantially adjacent one another;

a plurality of installation surfaces, each of which is coupled to one of said valve bodies, with each installation surface being positioned at a different height from an adjacent installation surface, with the heights being staggered in a step-wise manner from a greater height to a lower height;

a base member, with each of the plurality of installation surfaces being coupled to the base member; and a chemical flow path established through the base member directly connecting the plurality of valve bodies, wherein the flow path permits streamlined communication between each of the valve bodies such that the flow path, after entering the first valve body, travels in a non-upward direction.

8. The fluid apparatus structure of claim 7, wherein the base member includes valve body accommodating spaces and further comprising a water flow path that flows within the valve body accommodating spaces around the valve bodies.

9. The fluid apparatus structure of claim 7, wherein the valves bodies are plug-type valve bodies positioned in a valve body accommodating space.

10. The fluid apparatus structure of claim 9, further comprising a water circulation circuit communicating with the valve body accommodating space.

11. The fluid apparatus of claim 7, wherein the chemical flow path between at least two of the adjacent valve bodies is offset from an axial center of the respective valve bodies.

* * * * *